United States Patent [19]

Appleton

[11] Patent Number: 4,620,061
[45] Date of Patent: Oct. 28, 1986

[54] FULLY GROUNDED, CORROSION RESISTANT ELECTRICAL ENCLOSURE

[75] Inventor: Arthur I. Appleton, Miami Beach, Fla.

[73] Assignee: Appleton Electric Co., Chicago, Ill.

[21] Appl. No.: 649,214

[22] Filed: Sep. 10, 1984
(Under 37 CFR 1.47)

[51] Int. Cl.⁴ .............................................. H02G 3/14
[52] U.S. Cl. ........................................ 174/51; 220/3.8
[58] Field of Search ............................. 174/50, 51, 53; 220/3.8; 361/212, 215, 331, 334, 356, 380, 392, 424

[56] References Cited

U.S. PATENT DOCUMENTS

| | | | |
|---|---|---|---|
| 3,634,598 | 1/1972 | Stanfield | 174/51 |
| 3,724,706 | 4/1973 | Slocum | 174/50 |
| 3,927,249 | 12/1975 | Pearse | 174/51 |
| 4,260,863 | 4/1981 | Appleton | 200/144 |

Primary Examiner—A. D. Pellinen
Assistant Examiner—Greg Thompson
Attorney, Agent, or Firm—Jon L. Liljequist

[57] ABSTRACT

An electrical enclosure including a box and a cover is molded largely of plastic, but is intended for use with metallic conduit. One or more metallic inserts is molded within the box, and also another insert is molded within the cover, to provide ground continuity to all fully or partially contained wiring or control devices as well as to provide ground continuity to conduit leading into the box. The electrical enclosure optionally is explosion proof, requires a minimum of machining, provides means for the harmless run-off of all static electrical charges, and exposes a minimum of metallic surface area to the surrounding atmosphere which may contain metal degrading contaminants.

2 Claims, 7 Drawing Figures

FULLY GROUNDED, CORROSION RESISTANT ELECTRICAL ENCLOSURE

BACKGROUND OF THE INVENTION

As is well known, electrical enclosures exposed to corrosive or other contaminant laden air are susceptible to and may corrode or otherwise be attacked thereby. Contaminated atmospheres exist in many chemical plants and frequently where corrosive and other chemicals are used in the manufacture or processing of various products. The use of plastic enclosures in such atmospheres is a decided advantage because, depending upon airborne contaminant concentration and time, enclosures made of economically feasible metals may chemically react with those contaminants so as to freeze cover to box or become so eaten away as to become useless for their intended purpose.

Where electrical enclosures containing arcing devices are used in and around explosive atmospheres, various codes and standards prescribe that they be of explosion proof design to avoid potential injury to life and property. The underlying philosophy of explosion proof design where arcing could occur inside the enclosure is not to prevent explosive gases from gaining entry into the enclosure, but rather to contain any explosion that does occur therein so that the explosive flame front cannot propagate outside of the enclosure and ignite the surrounding atmosphere. Thus, explosion proof enclosing permit, but contain, a limited explosion therein rather than attempt to exclude an explosive gas.

Two principally plastic enclosures displaying somewhat different explosion proof design philosophy are disclosed in U.S. Pat. Nos. 3,927,249 to Pearse and 4,260,863 to Appleton. Both patents show a box and cover having a common interface when assembled that is not airtight and that can thus breathe so as to admit and expel whatever atmosphere surrounds the device, that atmosphere potentially containing contaminants. Various code requirements dictate the design of this interface, and when the interface is flat, some minimum amount of the material forming the interface must be metal. The Pearse patent incorporates a flat interface, and therefore this largely plastic enclosure incorporates metallic inserts that form a large part of the interface to satisfy this requirement of having metal at the interface. However, to satisfy explosion proof design requirements, the maximum allowable gap at the interface is so small that the Pearse device would more than likely require a secondary machining or grinding operation to achieve the necessary gap restrictions between box and cover where they join. Yet, some gap is desirable because any explosion occurring within the enclosure is vented through the gap to hold down internal pressure and prevent the enclosure from rupturing and thereby releasing the flame front to the surrounding atmosphere. Thus, the internal pressure is rather quickly relieved by venting expanding internal gases through the gap, and the flame front is quenched by the metallic surfaces defining the gap as it escapes therethrough.

If the contaminated atmosphere acts to eat away at the metallic interface, the interface gap between box and cover may so increase that the box loses its ability to quench any flame front attempting to escape. Alternatively, if the contaminated atmosphere reacts with the metal at the interface to fill up the gap, such as by products of corrosion, the vent may close up tightly that a later explosion within the box might create a pressure so intense as to rupture or blow the largely plastic box apart, thus also causing it to fail in its explosion proof function.

But even in applications where the electrical enclosure need not be explosion proof, the necessity to occasionally get inside the enclosure renders it most desirable to construct the enclosure of materials that are not attacked by corrosive or caustic gases. And although the use of plastic electrical enclosures and plastic sheathed cable is widespread under these conditions, many local building codes (such as in the City of Chicago) do not allow the use of plastic enclosures in conjunction with plastic sheathed cable.

In those locations where caustic, corrosive or otherwise contaminated atmospheres are present, and where local codes do not restrict the use of plastic enclosures, it would be desirable to use plastic electrical enclosures that can be conventionally connected into a metallic conduit system, yet provide all of the ground continuity advantages of a completely metallic electrical enclosure. Such an enclosure would have essentially all of the advantages, yet few or none of the disadvantages, of both plastic and metallic electrical enclosures. And, when such an electrical enclosure is designed for explosion proof applications, the absence of metal at the explosion proof interface ensures that the enclosure will not be altered in time by the effect of atmosphere laden contaminants so as to lose its explosion proof characteristics.

SUMMARY OF THE INVENTION

The instant invention improves upon earlier designs by providing an enclosure and cover having an essentially completely internal electrical grounding network that exposes very little metal to degrading ambient atmospheres. In the box portion of the enclosure, two metallic hubs are preferrably insert molded and directly connected with one another so as to provide electrical grounding continuity therebetween even when the enclosure's cover is off. Additionally, the cover is designed with its own metallic insert to provide not only direct grounding for any electrical apparatus attached thereto, but also auxiliary grounding for the spaced apart hubs.

The enclosure is also particularly adaptable to explosion proof applications when designed to include means in the form of a plastic tortuous flame path of a type similar to that of U.S. Pat. No. 4,260,863 to Appleton. As will be understood, substitution of essentially inert plastic for relatively degradable metal at the precise location where the electrical enclosure vents during an internal explosion ensures long life and reliable operation. Furthermore, this entirely plastic interface design eliminates the metallic flanges of Pearse that would likely need to be machined flat in order to meet maximum gap requirements that are set by such agencies as Underwriters Laboratories. Another advantage is in the provision of grounded metallic bosses to which a metallic nameplate can be attached to avoid a possible capacitive effect which could result in a static discharge external of the enclosure.

Various other advantages will become apparent upon a reading of the detailed description.

DETAILED DESCRIPTION OF PREFERRED EMBODIMENT

The following disclosure is offered for public dissemination in return for the grant of a patent. Although it is detailed to insure adequacy and aid understanding, this is not intended to prejudice that purpose of a patent which is to cover each new inventive concept therein no matter how others may later disguise it by variations in form or additions or further improvements.

Figure 1:
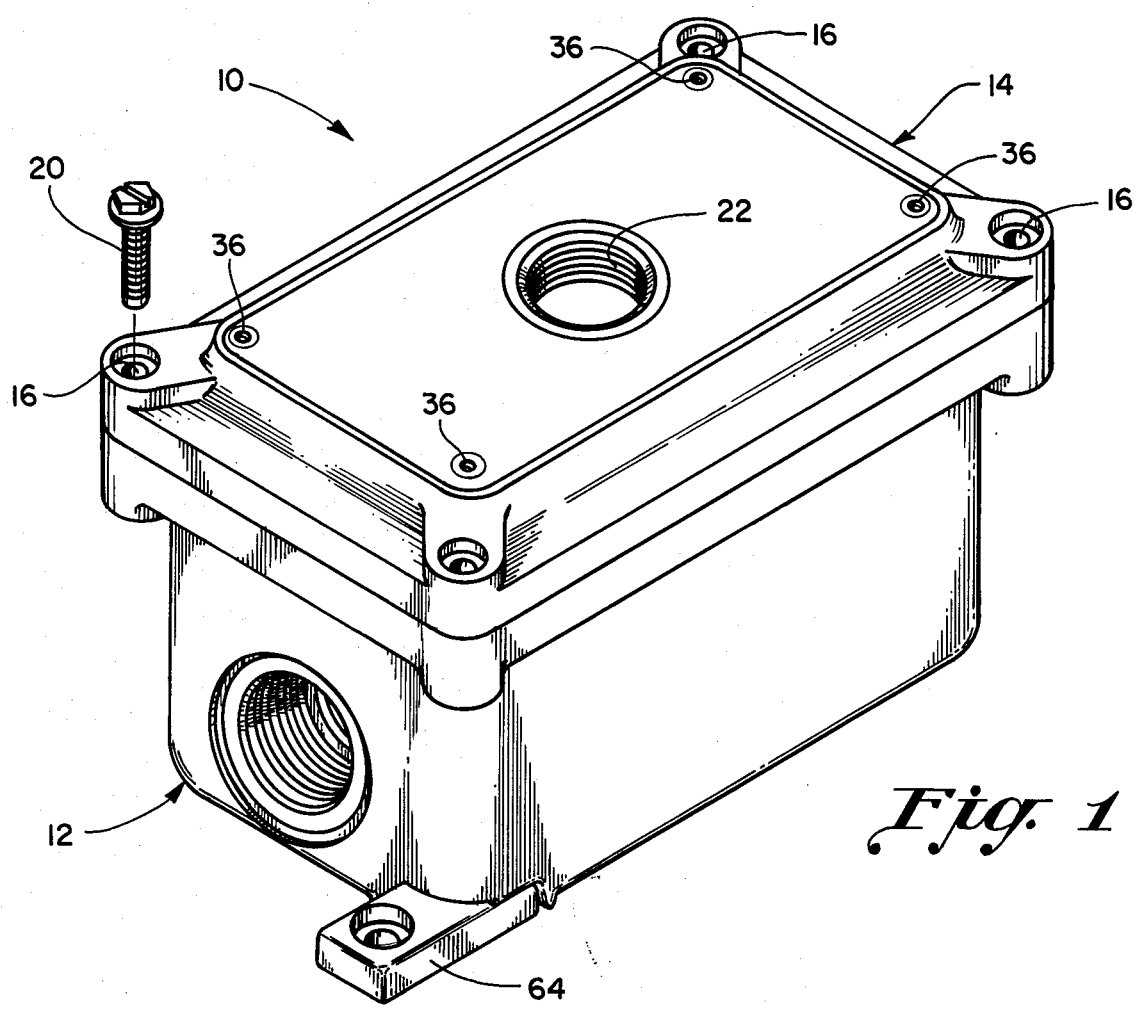
FIG. 1 is a perspective view of a complete electrical enclosure embodying the principals of the present invention and including both a box and a cover.
Figure 2:
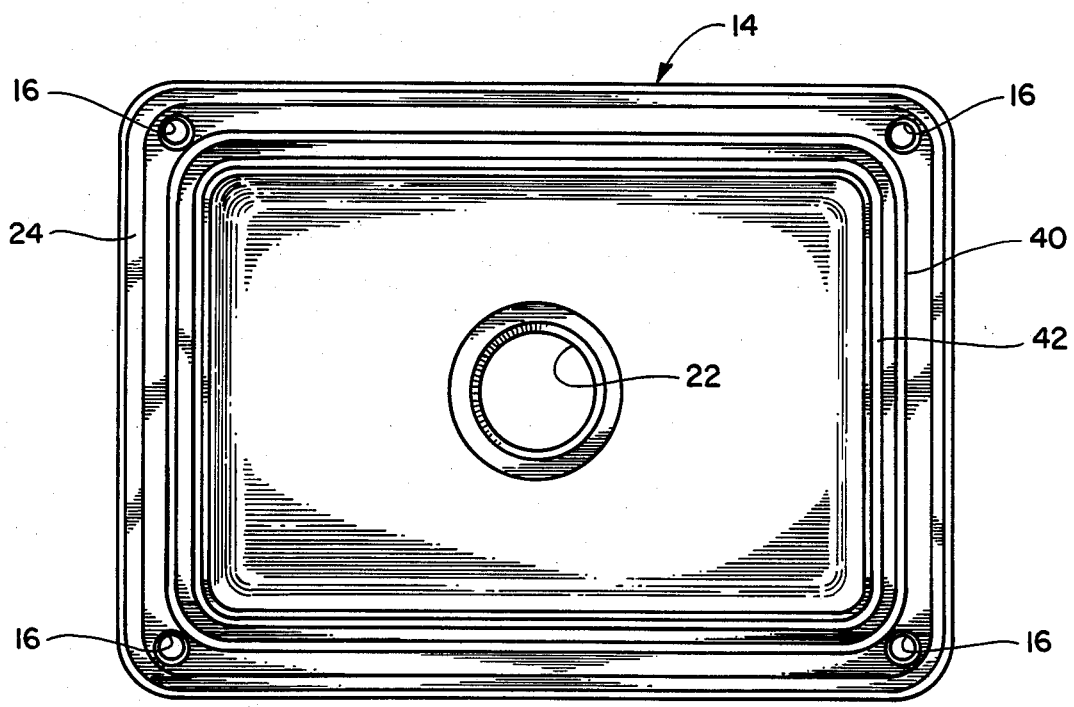
FIG. 2 is a view looking perpendicularly at the inner surface of the cover.
Figure 3:
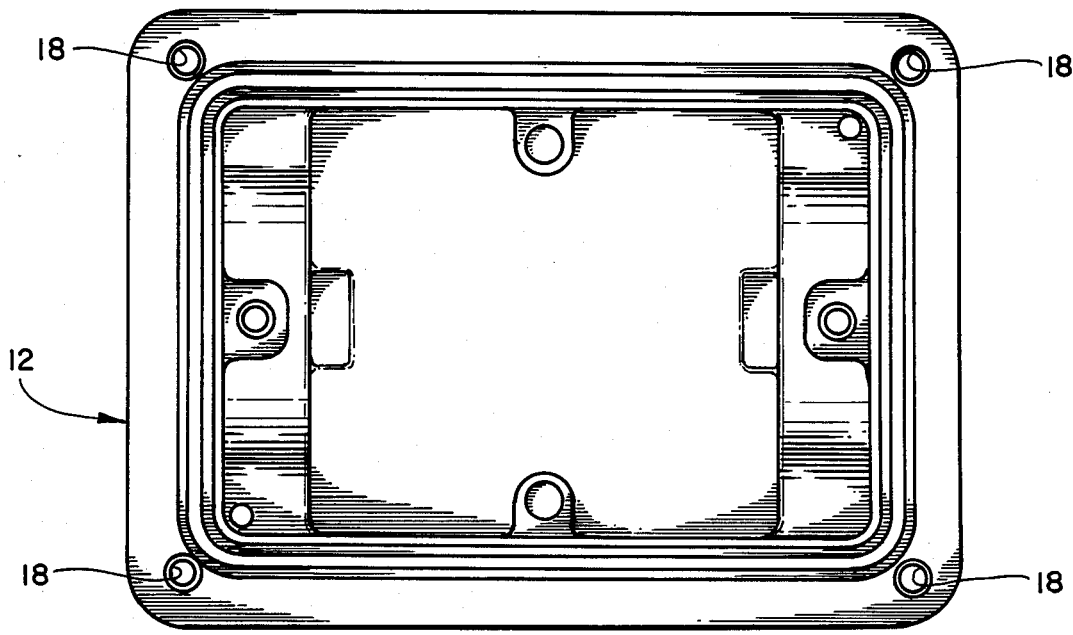
FIG. 3 is a view looking perpendicularly into the box portion of the enclosure.
Figure 6A:
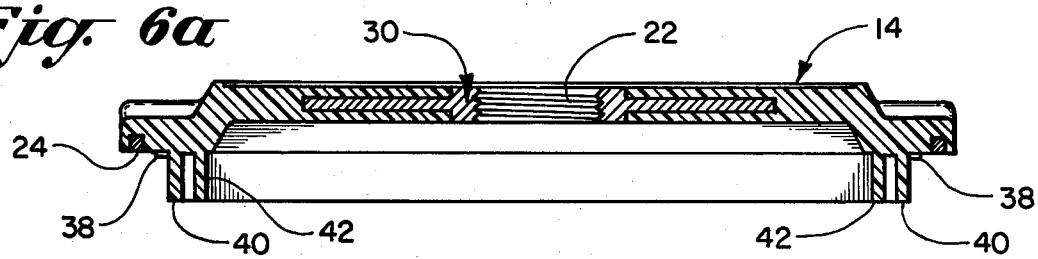
FIGS. 6a and 6b are cross sectional views of the cover and box, respectively, slightly separated, and taken along a plane running longitudinally through the center of the enclosure.
Figure 6B:
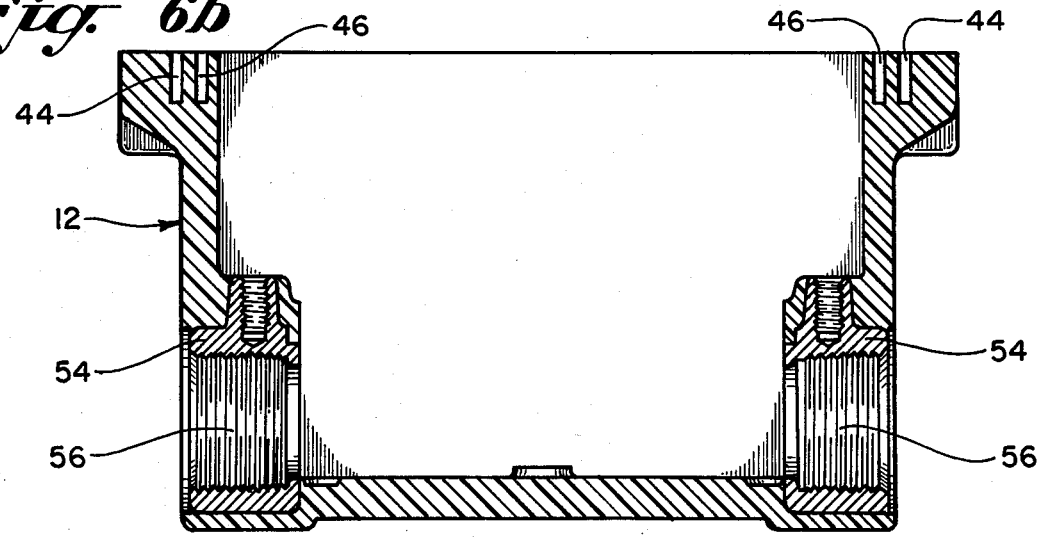

Referring now to the drawings, and particularly to FIGS. 1-3, there is shown an electrical enclosure generally at 10. Enclosure 10 includes generally a base or "box" 12 and a cover 14 therefor. Cover 14 is generally rectangular in shape and includes four corner holes 16 therethrough that align with four tapped corner holes 18 in the box to receive fasteners (such as the one shown at 20) which conventionally secure the cover to the box. The cover is shown in the drawings as having a single, centrally located hole 22 therethrough which is tapped to receive an electrical control component such as a switch, but it will be understood that the cover could include any number of holes (as well as none) which in the former case provide a mounting for a plurality of various electrical devices. If the enclosure is intended to be used in an environment where it is best kept dust-proof or water-proof, a seal as at 24 (see FIGS. 2 and 6a) can be employed in the cover to provide an appropriate degree of sealed integrity.

Figure 4:
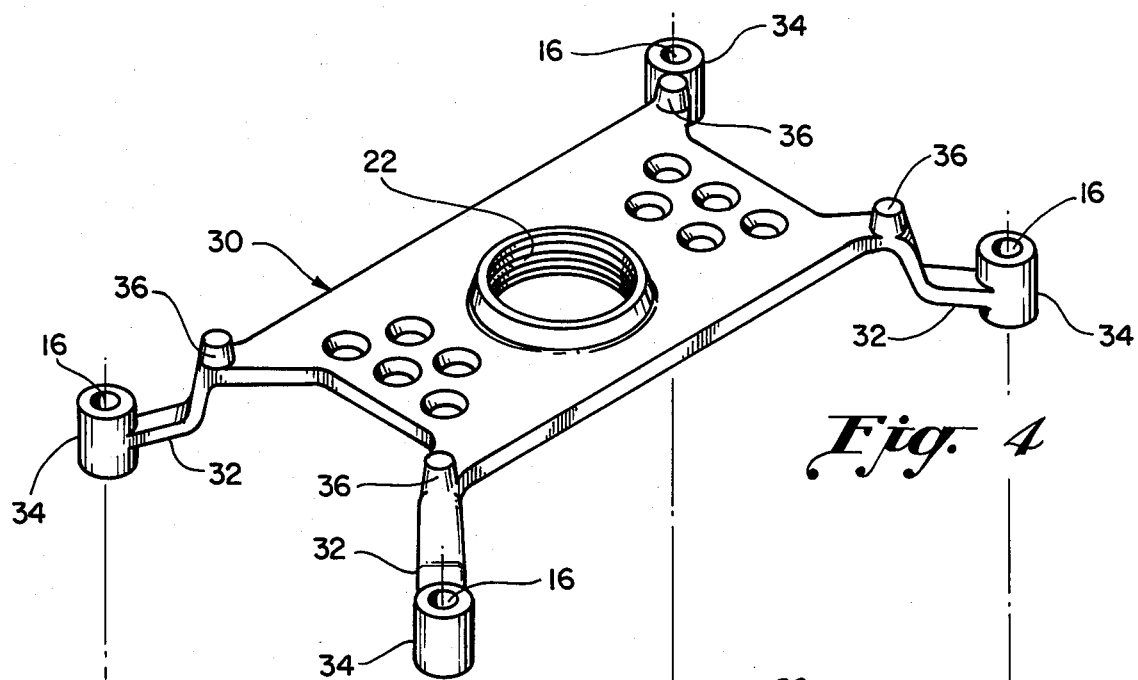
FIG. 4 is a perspective view of a representative insert such as can be molded into the cover.
Figure 5:
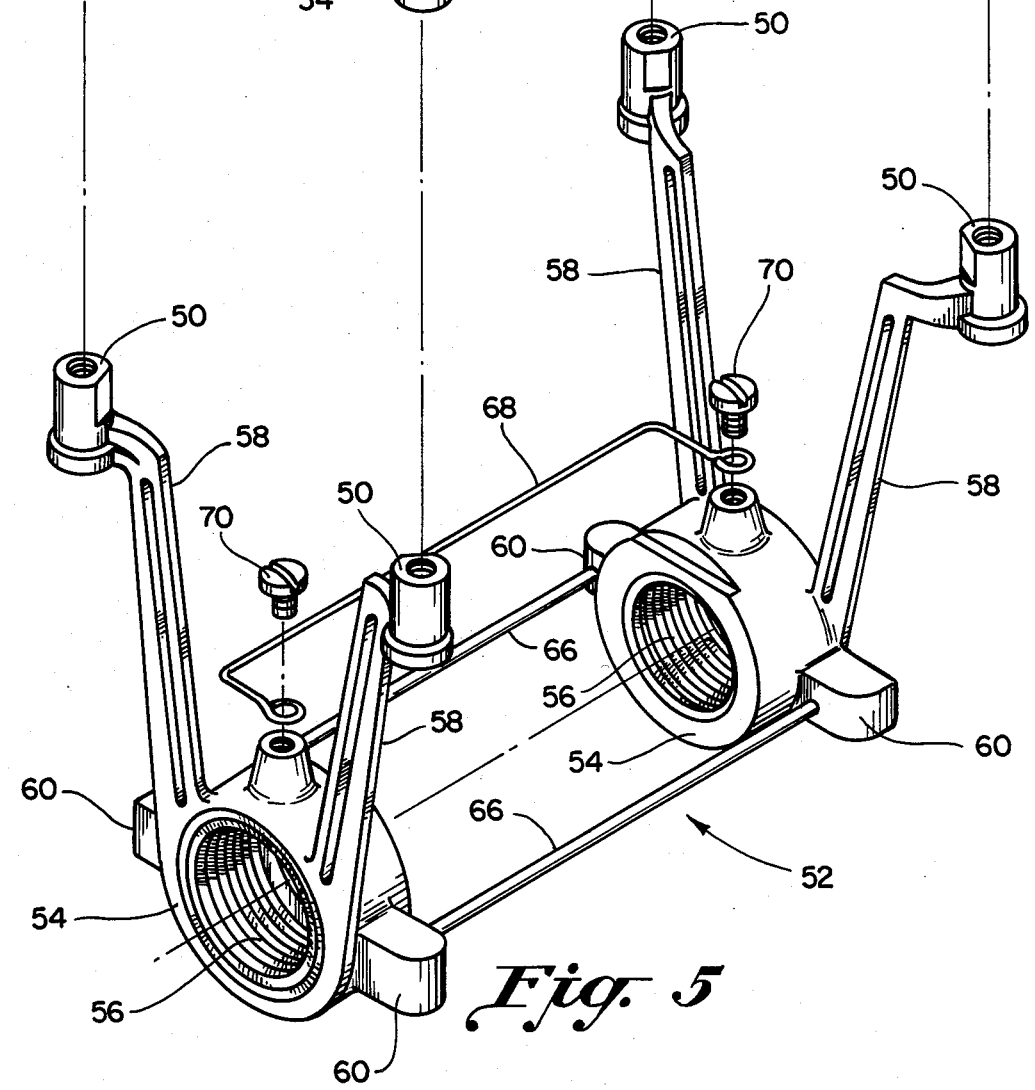
FIG. 5 is a perspective view of a representative insert such as can be molded into the box portion of the enclosure.

In FIG. 4 it can be seen that the cover's central hole 22 is in fact tapped through a metallic insert generally 30 that further includes four outwardly extending legs 32, each having a distal end 34 through which holes 16 extend. Insert 30 also includes four upstanding nameplate bosses 36 (which are tapped subsequent to being insert molded), the uppermost surface of which is exposed on the outwardly facing surface of cover 14, as can best be seen in FIG. 1. Distal ends 34 of insert 30 also include spacing bosses 38 (barely visible in FIG. 6a) on their box-facing sides which, as will be seen, provide both ground continuity between cover and box as well as the proper vent spacing at the interface between cover and box.

Cover 14 includes a pair of concentric projections 40 and 42 extending annularly around that portion of the cover that interfaces with box 12. These projections 40 and 42 mate within a pair of corresponding slots 44 and 46, respectively, in the box 12, however there is sufficient clearance between each projection and its mating slot as to form a vent for the escape of hot gases should an explosion occur within the enclosure 10. These interfitting projections and slots follow the design philosphy laid out in U.S. Pat. No. 4,260,863.

As will be understood, the gap between cover 14 and box 12 must be large enough to release the pressure of an internal explosion before that pressure exceeds the strength of the box, yet small enough that any flame in front escaping with the gas is effectively quenched before reaching the outside atmosphere. And, the magnitude of the gap is precisely determined by the height of metallic bosses 38 that rest on exposed metallic seats 50 forming a portion of the metallic insert generally 52 molded essentially entirely within the box 12. Insert 52 also includes a pair of hubs 54 that are tapped as at 56 to receive the threaded ends of rigid conduit or the like. Extending between seats 50 and hubs 54 are a plurality of runners 58, and to each side of each hub 54 is a projection 60 carrying a tapped hole in its bottom (not visible) used to secure mounting ears 64 to the box (see FIG. 1).

The two hubs 54 can be directly connected with one another by means of integrally formed bridge means 66 contained entirely within the plastic of the box, or alternatively, the two hubs 54 can be electrically bridged by a separate wire 68 electrically connected into each hub as by screws 70.

It will be understood that all of the metal used in this largely plastic electrical enclosure is interconnected, even to an optional metallic nameplate (not shown) which can be electrically grounded into the insert network by way of tapping bosses 36 on the cover insert 30 and screwing the nameplate thereto. There is thus no opportunity for any metallic portions to develop a static charge, nor could a metallic nameplate generate a capacitive charge because of its interconnection with the grounding network. Outside of a small amount of surface area where the various bosses, seats, hubs or tapped holes must be accessed from the outside, all metal is contained entirely within the plastic forming the enclosure and is therefore largely uneffected by any contaminated atmosphere to which it may be exposed.

When used in explosion proof applications, the seal 24 can either be eliminated, or alternatively, designed to permit a release of internal pressure while still providing a degree of sealing against adverse ambient conditions.

Finally, spacing bosses 38 of the cover insert directly engage seats 50 of the box insert 52 over a relatively small area, and thus the pressure exerted therebetween by way of fasteners 20 creates a significant pressure therebetween forming an extraordinary electrical contact.

I claim:

1. A fully grounded electrical enclosure, comprising:
a molded plastic box portion and a cover portion therefor, said box portion being constructed primarily of plastic and having molded essentially entirely therein a metallic box insert, said box insert including a plurality of tapped seats to which said cover is fastened, said insert also including at least one hub;

means forming a part of said box insert and electrically interconnecting all of said plurality of seats;

said cover portion also being constructed primarily of plastic and carrying a metallic cover insert contained essentially entirely therein, said cover insert including a plurality of holes therethrough exposed to either side of said cover portion and arranged to each receive a fastener attaching said cover portion into said seats in said box insert and increasing the electrical connection pressure between said cover insert and said seats, said cover insert also including at least one other hole therethrough for mounting an electrical device thereon such as a switch;

said enclosure exposing a minimum of metal to the surrounding atmosphere both outside and within the enclosure whereupon corrosion of the inserts is minimized.

2. A largely plastic, explosion proof, electrical enclosure comprising:

a box and a cover, each being molded primarily of plastic, and both designed to interfit with one another with a small gap therebetween, said interfit being defined at least in part by a projection and a groove, one forming a part of said box and the other forming a part of said cover;

said box also including a metallic box insert molded essentially entirely therein, said box insert including two internally threaded hubs of which each is connected to a pair of internally threaded seats to which said cover is mounted, said hubs including means interconnecting them with one another;

said cover also being constructed primarily of plastic and carrying a metallic cover insert molded essentially entirely therein, said insert in said cover further including means for groundingly attaching an electrical device thereto and also for grounding itself to said insert within said box, said inserts in said box and cover when engaged being positioned to hold said box and cover slightly apart to provide said gap between said projection and groove.

* * * * *